US011443038B2

United States Patent
Patne et al.

(10) Patent No.: US 11,443,038 B2
(45) Date of Patent: Sep. 13, 2022

(54) SYSTEMS AND METHODS FOR COUNTERING SECURITY THREATS IN A PASSIVE KEYLESS ENTRY SYSTEM

(71) Applicant: Toyota Motor North America, Inc., Plano, TX (US)

(72) Inventors: Satyajit Patne, The Colony, TX (US); Edward Allen Cain, Jr., San Antonio, TX (US); Gabriel Lawrence, Frisco, TX (US); Joshua Davis, Dallas, TX (US)

(73) Assignee: Toyota Motor North America, Inc., Plano, TX (US)

( * ) Notice: Subject to any disclaimer, the term of this patent is extended or adjusted under 35 U.S.C. 154(b) by 241 days.

(21) Appl. No.: 16/529,210

(22) Filed: Aug. 1, 2019

(65) Prior Publication Data
US 2020/0334357 A1 Oct. 22, 2020

Related U.S. Application Data

(60) Provisional application No. 62/835,949, filed on Apr. 18, 2019.

(51) Int. Cl.
*G06F 21/56* (2013.01)
*G07C 9/00* (2020.01)
*G07C 9/28* (2020.01)

(52) U.S. Cl.
CPC ......... *G06F 21/56* (2013.01); *G07C 9/00182* (2013.01); *G07C 9/28* (2020.01); *G06F 2221/032* (2013.01)

(58) Field of Classification Search
None
See application file for complete search history.

(56) References Cited

U.S. PATENT DOCUMENTS

| | | | | |
|---|---|---|---|---|
| 3,824,539 A * | 7/1974 | Horvath | ............ | B60R 25/1007 340/429 |
| 4,326,124 A * | 4/1982 | Faude | ............... | G07C 9/00722 235/382 |
| 4,574,268 A * | 3/1986 | Ohnishi | ................. | G08B 13/08 180/173 |
| 4,862,139 A * | 8/1989 | Fukamachi | ......... | B60R 25/1001 340/426.35 |
| 4,901,053 A * | 2/1990 | Fukamachi | ......... | B60R 25/1001 109/21 |
| 5,451,925 A * | 9/1995 | Le | .......................... | B60R 25/04 307/10.2 |

(Continued)

*Primary Examiner* — Curtis J King
(74) *Attorney, Agent, or Firm* — Christopher G. Darrow; Darrow Mustafa PC

(57) ABSTRACT

System, methods, and other embodiments described herein relate to securing wireless communications for passive keyless entry (PKE) to an asset. In one embodiment, a method includes monitoring operating conditions associated with the asset. The operating conditions identify security characteristics of the asset and interactions of wireless devices with the asset. The method includes selectively activating at least one countermeasure from an available group of countermeasures according to at least the operating conditions. The method includes wirelessly communicating, by the asset with an accessing device, according to the at least one countermeasure.

20 Claims, 13 Drawing Sheets

(56) References Cited

U.S. PATENT DOCUMENTS

| | | | | |
|---|---|---|---|---|
| 5,883,443 | A * | 3/1999 | Wilson | B60R 25/2072 307/10.2 |
| 6,049,268 | A * | 4/2000 | Flick | B60K 28/00 340/12.54 |
| 6,850,148 | B2 | 2/2005 | Masudaya | |
| 6,906,612 | B2 * | 6/2005 | Ghabra | B60R 25/24 340/5.61 |
| 7,042,342 | B2 * | 5/2006 | Luo | B60R 25/00 340/426.13 |
| 7,046,119 | B2 * | 5/2006 | Ghabra | B60R 25/245 340/5.61 |
| 9,210,188 | B2 | 12/2015 | Choi et al. | |
| 9,262,878 | B1 * | 2/2016 | Ghabra | H04L 27/0008 |
| 9,496,936 | B2 * | 11/2016 | Blatz | G07C 9/00309 |
| 9,584,542 | B2 | 2/2017 | Kim | |
| 9,613,475 | B2 | 4/2017 | Zivkovic et al. | |
| 9,637,086 | B2 | 5/2017 | Sanji et al. | |
| 9,654,912 | B2 | 5/2017 | Schatzberg et al. | |
| 9,710,983 | B2 | 7/2017 | Asmar et al. | |
| 9,712,496 | B2 | 7/2017 | Zivkovic et al. | |
| 9,761,075 | B2 | 9/2017 | Yoshihara | |
| 9,775,034 | B2 | 9/2017 | Hekstra et al. | |
| 9,794,753 | B1 | 10/2017 | Stitt et al. | |
| 9,800,610 | B1 * | 10/2017 | Lu | H04W 12/122 |
| 9,825,991 | B2 | 11/2017 | Ivanchykhin et al. | |
| 9,842,445 | B2 | 12/2017 | Lin | |
| 10,089,810 | B1 | 10/2018 | Kaye et al. | |
| 10,202,101 | B2 | 2/2019 | Kim | |
| 10,235,823 | B1 * | 3/2019 | Saleh | H04B 17/27 |
| 10,427,643 | B1 * | 10/2019 | Casamassima | B60R 25/241 |
| 10,486,648 | B1 * | 11/2019 | Lin | H04B 1/69 |
| 10,681,555 | B2 * | 6/2020 | Reedman | H04B 5/0025 |
| 10,685,515 | B2 * | 6/2020 | Hazebrouck | G01S 11/06 |
| 2003/0001723 | A1 * | 1/2003 | Masudaya | G07C 9/00309 340/5.61 |
| 2003/0222757 | A1 * | 12/2003 | Ghabra | G07C 9/00309 340/5.72 |
| 2006/0202798 | A1 * | 9/2006 | Baumgartner | B60R 25/2072 340/5.61 |
| 2007/0160206 | A1 * | 7/2007 | Ostrander | G06F 21/445 380/203 |
| 2008/0100427 | A1 * | 5/2008 | Desai | B60R 25/24 340/426.36 |
| 2008/0174446 | A1 * | 7/2008 | Ghabra | G07C 9/00309 340/13.2 |
| 2010/0026509 | A1 * | 2/2010 | Boehm | G08G 1/166 340/686.6 |
| 2010/0082180 | A1 * | 4/2010 | Wright | B60W 50/0098 701/1 |
| 2010/0308961 | A1 * | 12/2010 | Ghabra | G07C 9/00309 340/5.61 |
| 2010/0321154 | A1 * | 12/2010 | Ghabra | G07C 9/00309 340/5.61 |
| 2011/0148573 | A1 * | 6/2011 | Ghabra | B60R 25/245 340/5.61 |
| 2013/0072115 | A1 * | 3/2013 | Dobyns | H04B 5/0087 455/41.1 |
| 2014/0215567 | A1 * | 7/2014 | Yoshizawa | H04W 12/122 726/3 |
| 2014/0240090 | A1 * | 8/2014 | Mutti | B60R 25/24 340/5.61 |
| 2014/0248898 | A1 * | 9/2014 | O'Brien | H04W 4/40 455/456.1 |
| 2015/0022332 | A1 * | 1/2015 | Lin | B60R 25/00 340/426.1 |
| 2015/0130589 | A1 * | 5/2015 | Miyazawa | B60R 25/24 340/5.61 |
| 2015/0222658 | A1 * | 8/2015 | Kim | H04W 12/12 726/22 |
| 2016/0117877 | A1 * | 4/2016 | Hamada | G07C 9/00309 340/5.61 |
| 2016/0200291 | A1 * | 7/2016 | Kim | H04W 12/06 701/2 |
| 2018/0096546 | A1 * | 4/2018 | Bartels | G07C 9/00309 |
| 2018/0103414 | A1 * | 4/2018 | Golsch | H04W 4/30 |
| 2018/0265040 | A1 * | 9/2018 | Nowottnick | B60R 25/04 |
| 2019/0005753 | A1 * | 1/2019 | Leconte | B60R 25/245 |
| 2019/0114857 | A1 * | 4/2019 | Gustin | B60R 25/246 |
| 2019/0213145 | A1 * | 7/2019 | Stitt | B60R 25/00 |
| 2019/0227539 | A1 * | 7/2019 | Golgiri | H04W 4/80 |
| 2020/0114875 | A1 * | 4/2020 | Stitt | H04W 4/40 |
| 2020/0217947 | A1 * | 7/2020 | Stitt | G01S 13/84 |
| 2020/0219343 | A1 * | 7/2020 | Stitt | H01Q 21/24 |
| 2020/0229206 | A1 * | 7/2020 | Badic | H04W 4/023 |
| 2020/0351665 | A1 * | 11/2020 | Kelly | H04W 12/63 |

* cited by examiner

SYSTEMS AND METHODS FOR COUNTERING SECURITY THREATS IN A PASSIVE KEYLESS ENTRY SYSTEM

CROSS-REFERENCE TO RELATED APPLICATIONS

This application claims benefit of U.S. Provisional Application No. 62/835,949, filed on Apr. 18, 2019, which is herein incorporated by reference in its entirety.

TECHNICAL FIELD

The subject matter described herein relates, in general, to security mechanisms for countering malicious attacks on wireless communications, and, more particularly, to security mechanisms for countering relay attacks on a passive keyless entry system.

BACKGROUND

Traditionally, vehicle security has involved a vehicle owner using a physical key to manually lock a door and/or start a vehicle. As technology advances, this traditional vehicle security has morphed into more complex access/security systems that involve additional features but also encounter additional/different risks. For example, many vehicles now include wireless-capable key fobs that generally replace or at least supplement standard manual keys. These wireless key fobs can communicate wirelessly with the vehicle to perform functions such as unlocking the vehicle, setting alarms, opening doors/tailgates, etc. Wireless key fobs generally function via manual operation of buttons on the key fob by a user. While such wireless systems simplify access into the vehicle, such systems still generally require use of a key that is integrated with the fob to start the vehicle.

Accordingly, passive keyless entry systems advance on the technology of prior wireless systems by improving convenience still further. That is, passive entry systems generally include a key fob that automatically communicates the presence of the user/key fob to unlock doors. Moreover, the presence of the key fob in a pocket of a user or generally within the vehicle permits starting the vehicle without the need to insert a key manually. However, because the passive system may automatically communicate wirelessly without a user initiating the communications and because a user generally carries the passive key fob ubiquitously without regard to surroundings, difficulties can arise with malicious entities gaining access to the vehicle.

For example, in one approach, an attacker uses hardware devices to relay wireless messages between the car and the key fob. The vehicle attempts to ensure security by transmitting the messages with a limited range, but the malicious relay devices thwart this security and can provide the messages to the key fob when the key fob is remote from the vehicle. In this way, an attacker may gain access to the vehicle without possessing the key fob by using the relay devices to circumvent the existing security of the system. Accordingly, passive keyless entry systems can be vulnerable to malicious attacks.

SUMMARY

Example systems and methods disclosed herein relate to securing wireless communications of a passive access system from malicious attacks. For example, because a passive access system may wirelessly transmit communications without regard to proximity to a vehicle or other location to which the system is to provide access, the communications are generally vulnerable to interception and malicious manipulation. That is, an attacker can intercept and relay the communications from a remote location to a vehicle in order to activate the key fob and gain access to an asset even though the key fob is not proximate to the asset. Thus, in one approach, a system selectively implements various countermeasures to prevent such malicious attacks. In one embodiment, the system adapts a protocol for communicating by implementing countermeasures that include altering routines involved in the processing of communications or adapting the format of the communications themselves. The system may selectively activate the different countermeasures according to defined security characteristics of the system and/or dynamic conditions identified from the surrounding environment. Thus, the way in which the system communicates is dynamically adaptable without adding additional hardware. In this way, the system improves security against malicious attacks by leveraging existing aspects of the asset to identify threats and adapt operation.

In one embodiment, an access system for securing wireless communications for passive keyless entry (PKE) to an asset is disclosed. The system includes one or more processors and a memory communicably coupled to the one or more processors. The memory stores a monitoring module including instructions that when executed by the one or more processors cause the one or more processors to monitor operating conditions associated with the asset, the operating conditions identifying security characteristics of the asset and interactions of wireless devices with the asset. The monitoring module includes instructions to selectively activate at least one countermeasure from an available group of countermeasures according to at least the operating conditions. The memory stores a communication module including instructions that when executed by the one or more processors cause the one or more processors to wirelessly communicate with an accessing device according to the at least one countermeasure.

In one embodiment, a non-transitory computer-readable medium for securing wireless communications for passive keyless entry (PKE) to an asset and including instructions that when executed by one or more processors cause the one or more processors to perform one or more functions is disclosed. The instructions include instructions to monitor operating conditions associated with the asset. The operating conditions identifying security characteristics of the asset and interactions of wireless devices with the asset. The instructions include instructions to selectively activate at least one countermeasure from an available group of countermeasures according to at least the operating conditions. The instructions include instructions to wirelessly communicate with an accessing device according to the at least one countermeasure.

In one embodiment, a method for securing wireless communications for passive keyless entry (PKE) to an asset is disclosed. In one embodiment, the method includes monitoring operating conditions associated with the asset. The operating conditions identify security characteristics of the asset and interactions of wireless devices with the asset. The method includes selectively activating at least one countermeasure from an available group of countermeasures according to at least the operating conditions. The method includes wirelessly communicating, by the asset with an accessing device, according to at least one countermeasure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
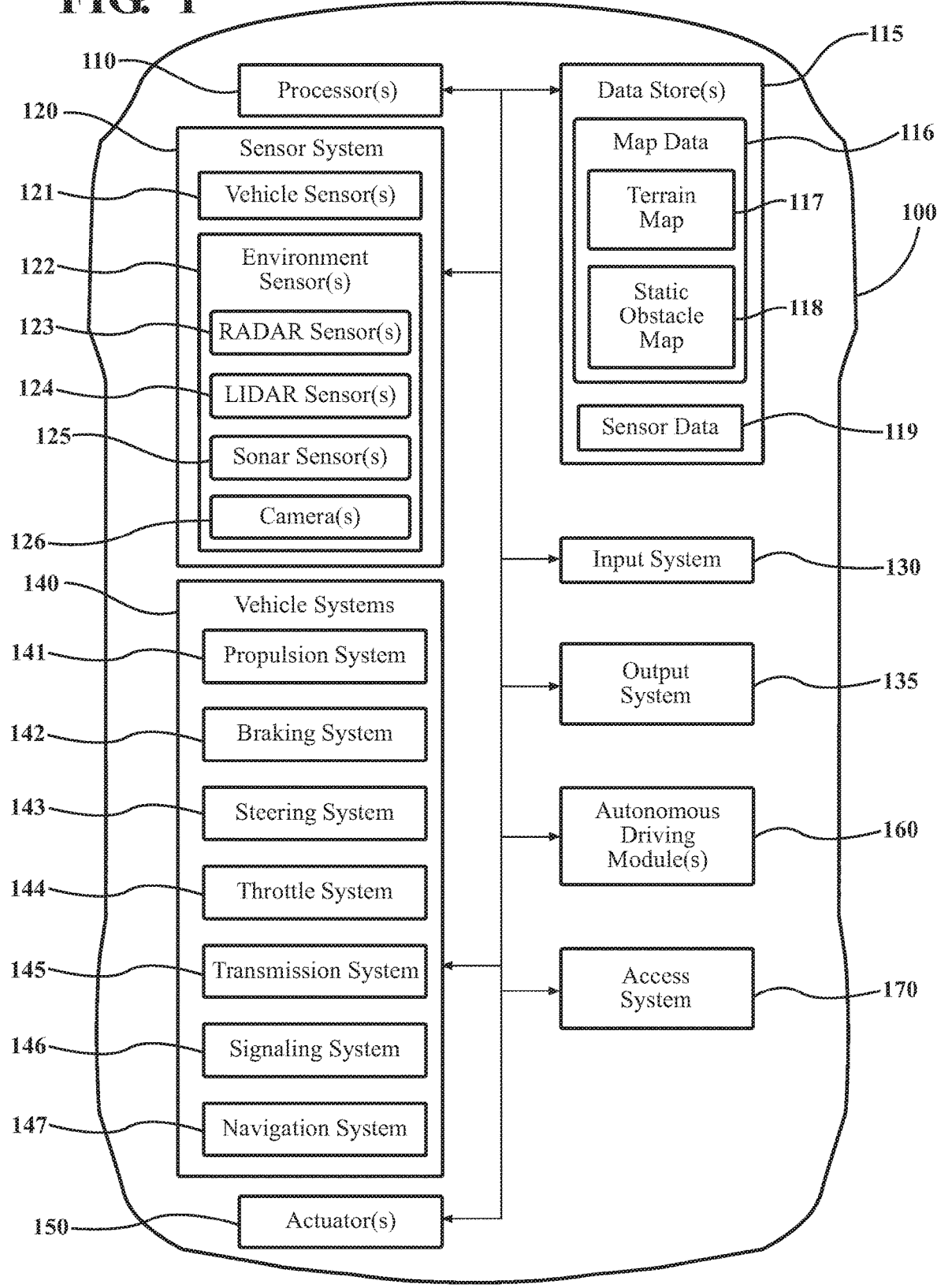
FIG. 1 illustrates one embodiment of a vehicle within which systems and methods disclosed herein may be implemented.

Systems, methods, and other embodiments associated with securing wireless communications using a set of countermeasures are disclosed. As previously noted, a passive access system may wirelessly transmit communications without regard to a proximity to an asset to which the system is to provide access. This characteristic of the way in which a passive keyless entry (PKE) systems communicates means that the communications can be vulnerable to interception and malicious manipulation/redirection. That is, an attacker can intercept and relay the communications in order to, for example, extend a range of the communications beyond that which is intended by the PKE system. As a result, an attacker can activate the key fob even when the key fob is away from the vehicle and relay a valid response message from the key fob back to the vehicle. In this way, the attacker can circumvent the security of the PKE system associated with limiting the range of the communications, and gain access even though the key fob is not present near the vehicle.

Thus, in one approach, a system selectively implements various countermeasures to prevent such malicious attacks. In one embodiment, the system adapts a protocol for communicating by implementing countermeasures that include altering routines involved in the processing of communications or adapting the format of the communications themselves. The system may selectively activate the different countermeasures according to defined security characteristics of the system and/or dynamic conditions identified from the surrounding environment such as identified communications from nearby wireless devices. In various aspects, the defined security characteristics may indicate a subset of the countermeasures that are to be active and/or dynamic conditions for activating various ones of the countermeasures. The dynamic conditions include, in one or more approaches, identifying malicious communications, receiving a response message after or near a time limit, receiving a response message on an incorrect frequency, and so on.

Moreover, the available countermeasures can include various modifications to the PKE communication protocol associated with the vehicle such as iteratively changing a random number of a challenge message at a defined interval, setting a timer for receiving a response to a particular challenge message, actively detecting malicious communications, implementing a secure wakeup/exchange, localizing a source of communications, changing transmission frequencies, and so on. As may be appreciated, the disclosed system, in one or more approaches, implements the countermeasures as additional software routines that adapt the underlying communication protocol of the PKE system. Accordingly, the disclosed approach can adapt existing systems to improve resilience against malicious attacks without the need to change static/hardwired aspects of the systems.

Accordingly, the way in which the system communicates is dynamically adaptable to avoid the noted difficulties with attacks on PKE systems. In this way, the system improves security against malicious attacks by leveraging existing aspects of the asset to identify threats and adapt operation without the need to implement additional hardware.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles, but embodiments are discussed in relation to automobiles as one example of an asset associated with a PKE system. In some implementations, the vehicle 100 may be any form of transport, building, structure, or other secured space that, for example, includes a passive keyless entry system, and thus benefits from the functionality discussed herein.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-13 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes an access system 170 that functions to improve the security of wireless communications associated with accessing the vehicle 100. As noted previously, because wireless communications are intrinsically vulnerable and because the underlying protocol for PKE involves transmitting communications without regard to a proximity of a key fob, the PKE system can be vulnerable to malicious attacks such as relay attacks. Thus, the access system 170 leverages a set of countermeasures to act against such potential malicious attacks. Moreover, while depicted as a standalone component, in one or more embodiments, the access system 170 is integrated with a passive keyless entry (PKE) system (not illustrated), a communication system (not illustrated), or another component of the vehicle 100. Thus, the access system 170 may be integrated into another component for which the access system 170 is providing oversight. The noted functions and methods will become more apparent with a further discussion of the figures.

Moreover, while the access system 170 is generally discussed in relation to a passive keyless entry system, it should be appreciated that the access system 170 may protect other systems that function in a similar manner and is not limited to only PKE systems. For example, the access system 170, in one or more embodiments, protects smart key systems, wireless home entry systems, remote keyless entry systems, remote keyless ignition systems, and other systems that communicate wirelessly to provide access to an asset. Thus, while the present disclosure focuses on vehicles and PKE systems, the disclosed approaches may be applicable to further types of assets that implement other wireless access systems.

Figure 2:
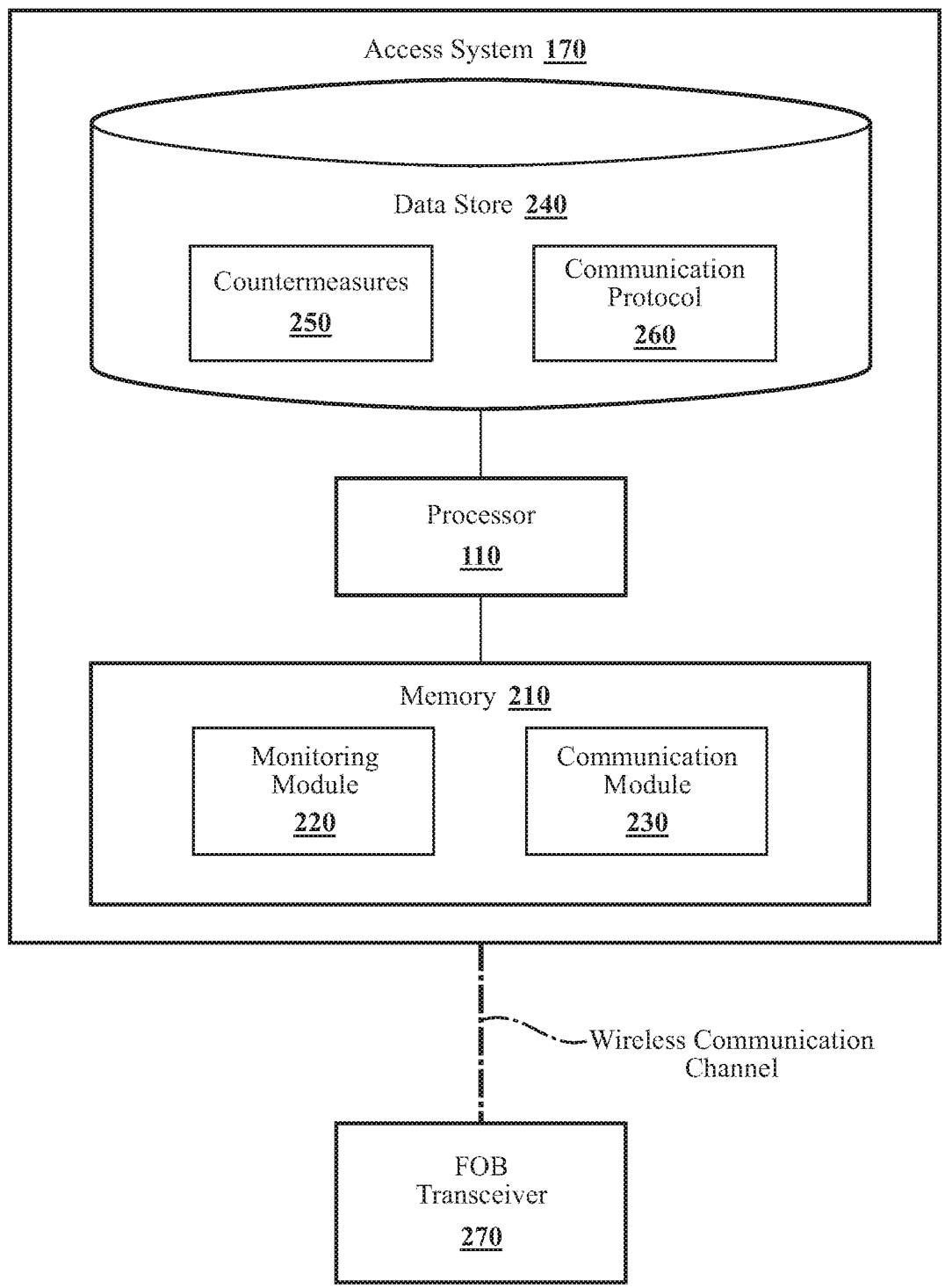
FIG. 2 illustrates one embodiment of an access system that is associated with improving the security of wireless communications against malicious attacks.

With reference to FIG. 2, one embodiment of the access system 170 is further illustrated. As shown, the access system 170 includes a processor 110. Accordingly, the processor 110 may be a part of the access system 170 or the access system 170 may access the processor 110 through a data bus or another communication path. In one or more embodiments, the processor 110 is an application specific integrated circuit that is configured to implement functions associated with a monitoring module 220 and a communication module 230. In general, the processor 110 is an electronic processor such as a microprocessor that is capable of performing various functions as described herein when implemented in combination with the noted instructions and/or modules. In one embodiment, the access system 170 includes a memory 210 that stores the monitoring module 220 and the communication module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein. In one or more embodiments, the modules 220 and 230 are embedded in an on-chip memory of the processor 110.

Furthermore, in one embodiment, the access system 170 includes a data store 240. The data store 240 is, in one embodiment, an electronic data structure such as a database that is stored in the memory 210 or separately in another memory and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes countermeasures 250, and communication protocol 260 along with, for example, other information that is used by the modules 220 and 230.

FIG. 2 further illustrates a fob transceiver 270 that communicates with the access system 170 via a wireless communication channel. The fob transceiver 270 may be a distinct physical key fob device, an application executing on a separate mobile device (e.g., a smartphone), or another device that communicates wirelessly. The fob transceiver 270 is generally capable of receiving wireless communications and transmitting wireless communications according to the communications protocol 260 and the countermeasures 250. In one or more arrangements, the fob transceiver 270 receives and transmits wireless communications on a range of available frequencies. For example, the fob transceiver 270, in one or more embodiments, communicates on low frequencies (e.g., 30 kHz-300 kHz), medium frequencies (e.g., 300 kHz-3 MHz), ultra-high frequencies (e.g., 300 MHz-3 GHz), and other such frequencies ranges as may be employed by such a device. Accordingly, the access system 170/communication module 230 also communicates wirelessly in the noted frequency ranges.

As a general characteristic of the wireless communications, the access system 170 and/or the fob transceiver transmits at least one communication having a defined range. In other words, the transmission frequency of the at least one communication is of a short or limited range (e.g., 5-20 meters) in order to, for example, secure the communication through limiting possible recipients. The noted communication channel generally embodies the specified frequency ranges and may have additional characteristics as specified by the communications protocol 260. The additional characteristics may indicate timing constraints (e.g., to avoid collision between communications), encryption standards (e.g., public-key infrastructure, session key formation, etc.), frame formatting for communications, and other such aspects.

Figure 3:
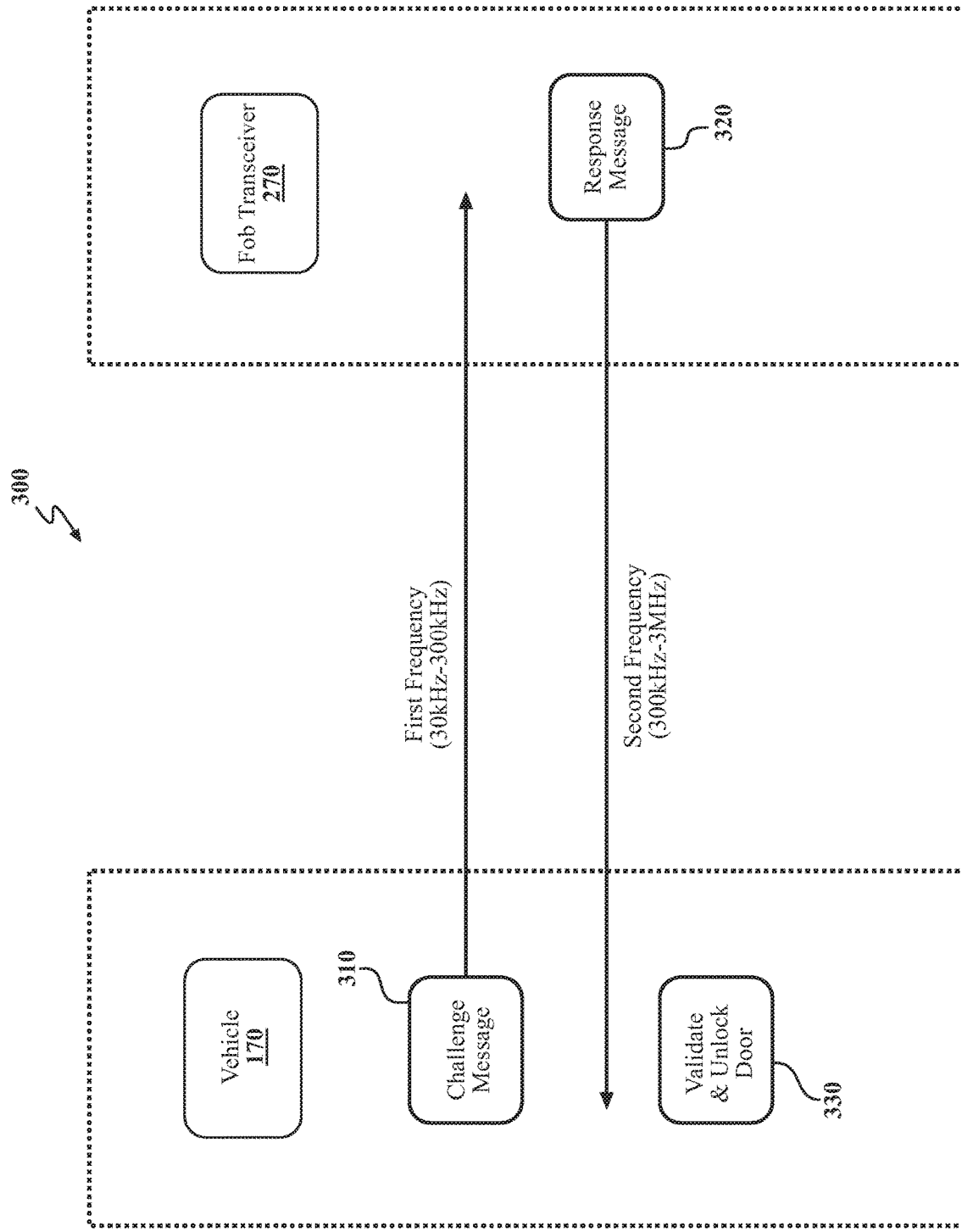
FIG. 3 is a diagram illustrating one configuration of an exchange between two devices communicating wirelessly.
Figure 4:
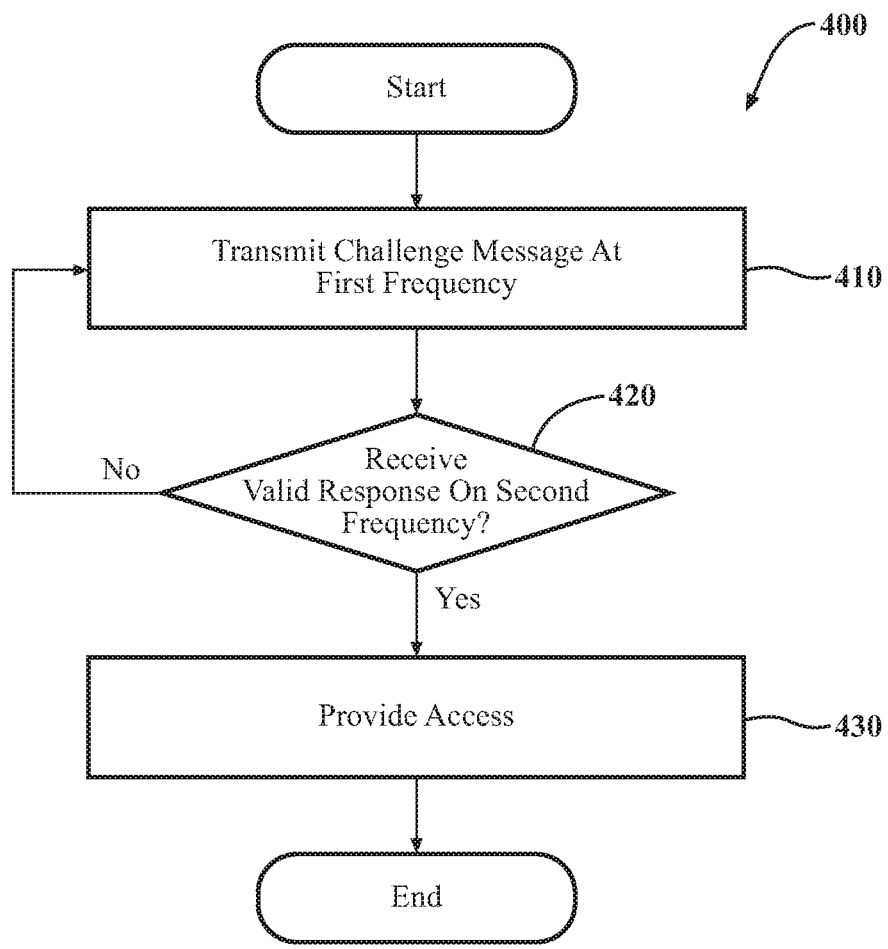
FIG. 4 is a flowchart illustrating one embodiment of a method associated with providing access to an asset using wireless communications in a passive entry system.

By way of example, briefly consider FIG. 3, which illustrates one example of an exchange 300 of communications between the access system 170 and the fob transceiver 270, and FIG. 4, which illustrates a flowchart of an associated method 400. Method 400 will be discussed from the perspective of the access system 170 of FIGS. 1-2. While method 400 is discussed in combination with the access system 170, it should be appreciated that the method 400 is not limited to being implemented within the access system 170 but is instead one example of a system that may implement the method 400. Moreover, while FIG. 4 illustrates the flowchart of method 400 in a serial manner, it should be appreciated that one or more of the noted functions may execute in parallel.

As illustrated, at 410, the access system 170 initially transmits a challenge message 310 over a first frequency that is between, for example, 30 kHz-300 kHz. The fob transceiver 270 receives and processes the challenge message 310 to generate a response message 320. In one embodiment, the fob transceiver 270 processes the challenge message 310 by, for example, decoding a message authentication code (MAC) within the message and verifying the identity of the vehicle 100/access system 170 according to a one-way encryption scheme (e.g., PKI). The fob transceiver 270, in one approach, generates the response message 320 by encrypting a pseudorandom number decrypted from the challenge message 310 using a private key of the fob transceiver 270 (e.g., a private key of a PKI asymmetric key pair). The fob transceiver 270 can then wirelessly transmit the response message 320 over a second frequency (e.g., between 300 kHz-3 MHz) that is different from the first frequency to provide the response message to the access system 170.

The access system 170, at 420, receives the response message 320 and processes the response message in a similar manner as the fob transceiver 270 processes the challenge message 310 to validate the identity of the fob transceiver as the source of the communication. Upon validating the message 330, the access system 170, at 430, provides access to the vehicle 100 (e.g., unlock a door, permit ignition start, etc.). It should be appreciated that while the exchange between the access system 170 and the fob transceiver 270 is discussed as a single exchange, the exchange may be repeated iteratively at a defined interval in order to periodically confirm that the fob transceiver 270 is present. In various approaches, when the access system 170 no longer detects the presence the of the fob transceiver via the noted exchange, then the access system 170, for example, rejects access by locking the vehicle 100 or performing other similar actions. In this way, the access system 170 in combination with the fob transceiver 270 control access into the vehicle 100 or another asset.

Figure 5:
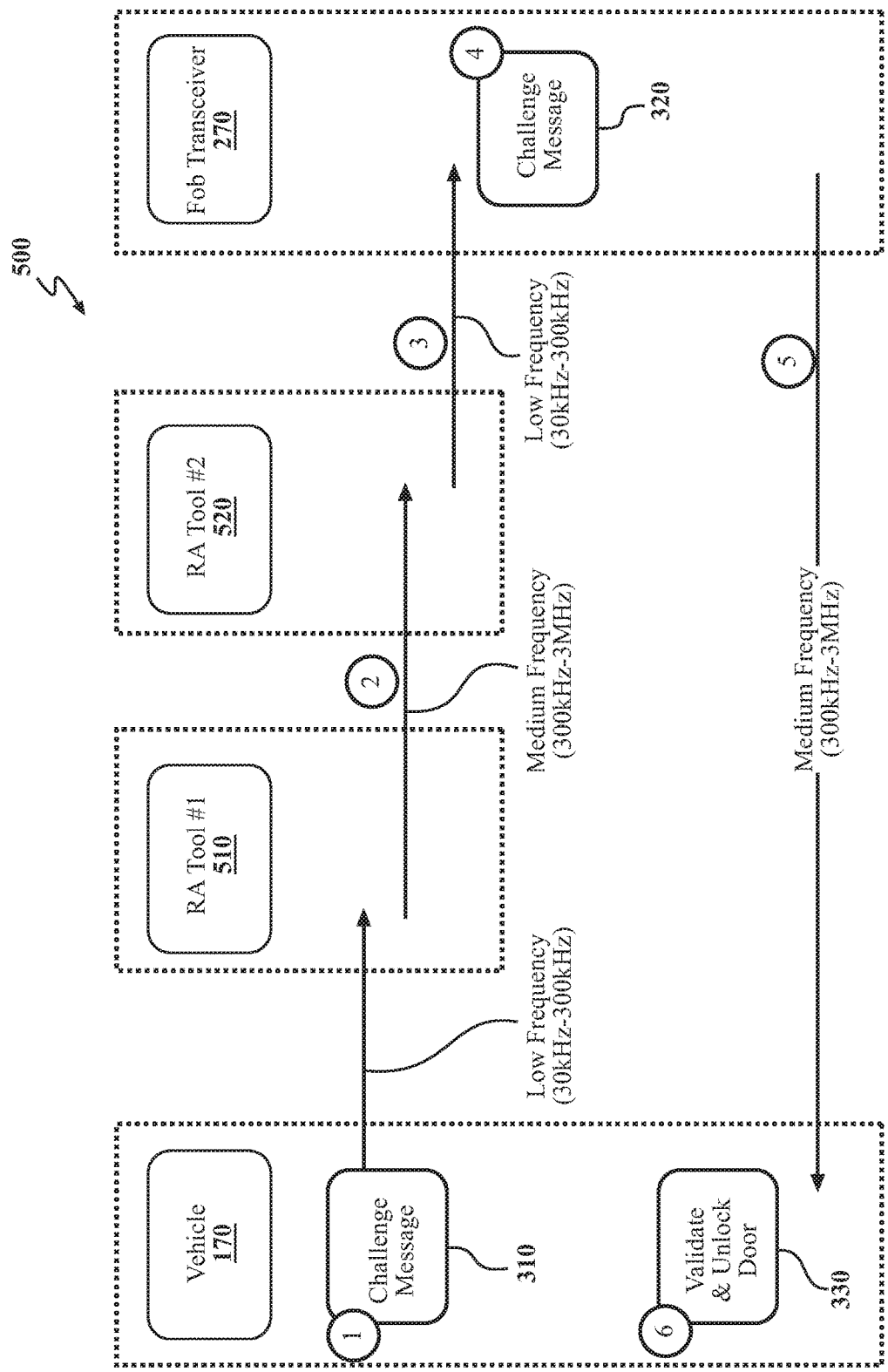
FIG. 5 illustrates one example of a relay attack on a vehicle implementing a passive entry system.

However, as previously noted, because the wireless communications from the vehicle 100 and the fob transceiver 270 may be provided without regard to a proximity of the fob transceiver to the vehicle 100, the communications can be vulnerable to malicious attack. One example of a relay attack on the wireless exchange discussed previously is shown in FIG. 5. FIG. 5 illustrates an exchange 500 of communications between the access system 170 and the transceiver 270 with a first relay attack (RA) tool 510 and a second RA tool 520 intercepting and relaying the communications.

As shown, the same communications and processing as discussed in relation to FIG. 3 (e.g., 310, 320, and 330) are performed between the access system 170 and the transceiver 270. However, the tools 510 and 520 intervene with the communication of the original challenge message 310 to effectively extend a range of the communication beyond the locality of the vehicle 100. Thus, whereas the challenge message from the access system 170 may reach roughly five or so meters when transmitted at the noted frequency, the RA tool 510 intercepts the message 310 near the vehicle 100 and extends the range through communicating the message at a different longer-range frequency to the second RA tool 520. The second RA tool 520 then retransmits the message 310 at the original frequency or a similar frequency to the fob transceiver 270. In various approaches, the transmission frequency of the fob transceiver 270 may be adequate to extend the entire distance, as shown, or the RA tools 510 and 520 may intervene with retransmission of the response message 320 in a similar manner as with the challenge message 310.

Thus, the RA tools 510 and 520 can effectively extend the range by fifty to a hundred meters or more. As such, when the fob transceiver is, for example, in a user's pocket inside a store, mall, restaurant, a malicious attacker can use the tools 510 and 520 to activate access to the vehicle 100 without knowledge of the user. The access system 170 selectively implements the countermeasures 250 to frustrate this type of attack and others.

Continuing with FIG. 2, the monitoring module 220 generally includes instructions that function to control the processor 110 to monitor operating conditions associated with the vehicle 100 or another asset. In one or more approaches, the operating conditions include aspects such as security characteristics of the vehicle 100, interactions of wireless devices (e.g., RA tools and other malicious devices) with the vehicle 100, and so on. In one embodiment, the security characteristics define a base group of countermeasures of the available countermeasures 250 that the access system 170 initially employs.

That is, the monitoring module 220, in one or more aspects, selectively activates separate countermeasures according to the operating conditions including the interactions, which are generally dynamic conditions, and the security characteristics. Thus, the security characteristics can indicate which of the countermeasures 250 are to be implemented irrespective of dynamic conditions that arise, and are thus also referred to as the base group of countermeasures since they are integrally active according to values specified in an internal register or specified otherwise according to, for example, an OEM or vehicle owner preferences.

The particular countermeasures 250 will be discussed in greater detail subsequently but generally include aspects that function on existing hardware elements of the vehicle 100. That is, the countermeasures 250 are generally software-based and function to adapt the ways in which the communication protocol 260 formats the communications themselves or adapts routines for transmitting and receiving the communications. The communication protocol 260 generally defines the format and routines for conducting communications within the PKE system. Thus, the monitoring module 220 can selectively activate the countermeasures 250 by adapting the communication protocol 260 as defined by the individual activated countermeasures 250. In various approaches, the monitoring module 220 activates the countermeasures 250 by performing additional routines that alter the communications, actively monitor transmission/reception of communications, adjust transmission/reception (e.g., change frequencies), and/or perform other such functions as will be explained subsequently.

Continuing with further elements of FIG. 2, the communication module 230 generally includes instructions that function to wirelessly communicate with an accessing device (e.g., transceiver 270). Accordingly, in one or more approaches, the communication module 230 transmits and receives the communications or at least controls hardware elements (e.g., wireless network interface) that perform the transmitting and receiving. Moreover, the communication module 230, in one or more embodiments, functions to implement the communication protocol 260 and thus also functions to implement at least a portion of the countermeasures 250. Consequently, while the monitoring module 220 performs various actions to monitor the operating conditions and selectively activate the countermeasures 250, the communication module 230 carries out the execution of at least a portion of the countermeasures 250 and also executes other functions according to the protocol 260 such as generating pseudorandom numbers, decoding/decrypting communications, encrypting communications, and so on.

Figure 6:
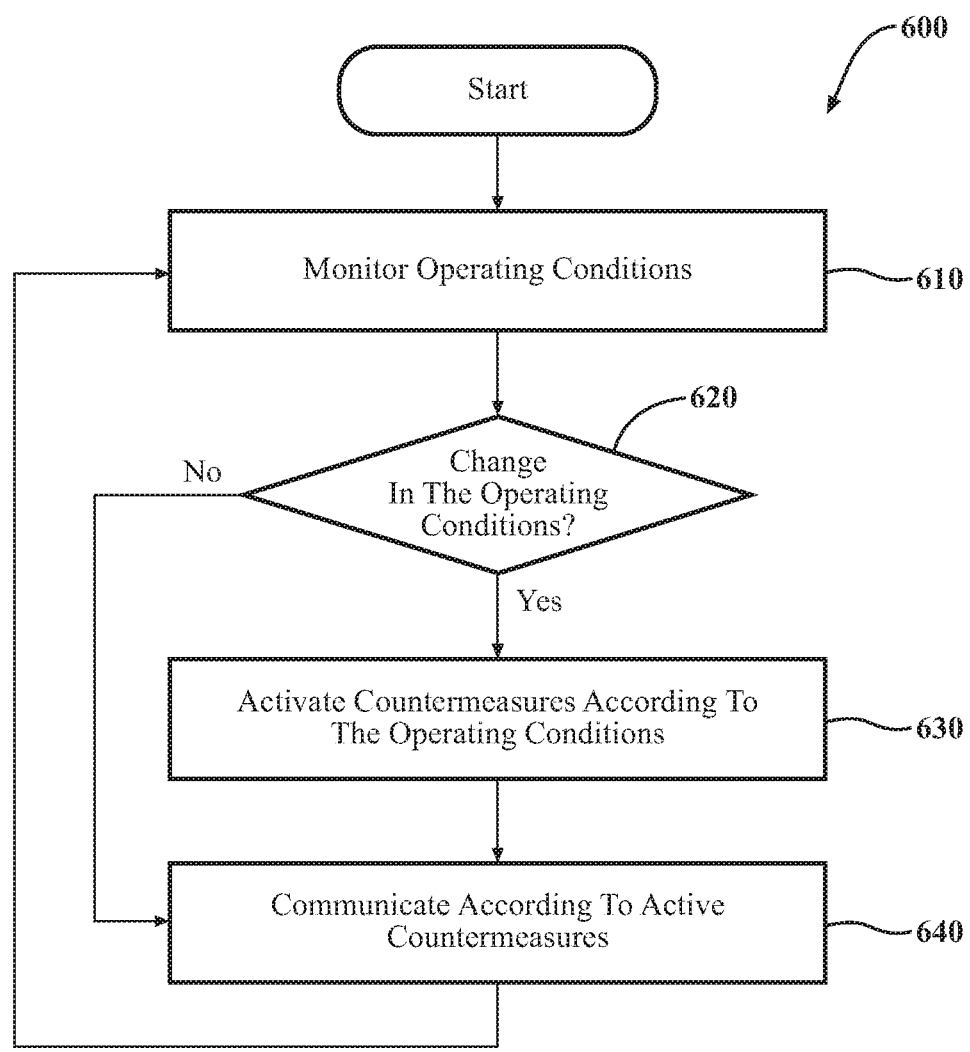
FIG. 6 is a flowchart illustrating one embodiment of a method associated with selectively activating countermeasures to thwart malicious attacks.

Additional aspects of improving the security of wireless communications for accessing an asset will be discussed in relation to FIG. 6. FIG. 6 illustrates a flowchart of a method 600 that is associated with dynamically identifying operating conditions and selectively activating countermeasures according thereto. Method 600 will be discussed from the perspective of the access system 170 of FIGS. 1-2. While method 600 is discussed in combination with the access system 170, it should be appreciated that the method 600 is not limited to being implemented within the access system 170 but is instead one example of a system that may implement the method 600. Additionally, while the method 600 is illustrated as a generally serial process, various aspects of the method 600 can execute in parallel to perform the noted functions.

At 610, the monitoring module 220 monitors operating conditions associated with the vehicle 100. In one embodiment, the monitoring module 220 monitors the operating conditions by, for example, identifying security characteristics of the vehicle 100, identifying characteristics of received communications, and/or identifying aspects associated with nearby devices that may be communicating.

For example, the access system 170 may define the security characteristics internally within the vehicle 100 and/or within the access system 170 in particular. Thus, the monitoring module 220 identifies the security characteristics from a register, cache, or other memory within the vehicle 100. The security characteristics define, for example, a base security level of the vehicle 100, which includes one or more of the countermeasures 250 that are to be active as a base group of countermeasures for securing the vehicle 100. Thus, the security characteristics define, in one approach, countermeasures that minimally alter the communication protocol 260 or passively monitor the communications for threats whereas further countermeasures may involve more robust/invasive adjustments to the communication protocol 260.

In a further aspect, the monitoring module 220 sniffs, or otherwise actively or passively acquires the operating conditions from a stream of electronic information provided within the access system 170. In other words, the monitoring module 220 observes communications received by the vehicle 100, some of which may be intended for the vehicle 100 while others may be intended for other devices. In either case, the monitoring module 220 can characterize interactions of nearby wireless devices by identifying aspects of the wireless communications.

In one approach, the monitoring module 220 analyzes the communications for various dynamic conditions such as i) nearby wireless communications having a substantially similar transmission frequency and/or timing in relation to communications of the access system 170, ii) receiving a response substantially at (e.g., within or beyond a timing constraint), iii) identifying a tracked trajectory for a source of a communication that does not correlate with a location proximate to the asset, and iv) identifying a communication that fails to satisfy an active one of the available group of countermeasures, v) detecting activation of a vehicle security system, and other such dynamically detectable conditions that indicate potential threats to the vehicle 100 or another associated asset. As previously noted, it should be appreciated that while the monitoring is illustrated in series with other functions of method 600, in general, monitoring the operating conditions may occur in parallel with functions such as wirelessly communicating as discussed at block 640.

At 620, the monitoring module 220 determines whether the identified operating conditions from block 610 are distinct from prior observed conditions or are newly identified. Thus, in one embodiment, if the monitoring module 220 has previously observed the operating conditions (e.g., security characteristics), then the communication module 230 proceeds to wirelessly communicate without changing the activate countermeasures at 640. However, if the monitoring module 220 identifies a change (e.g., violation of a timing constraint, detection of a near band communication), then the monitoring module 220 proceeds to selectively activate one or more additional countermeasures at 630.

At 630, as noted, the monitoring module 220 selectively activates at least one countermeasure from an available group of countermeasures 250 according to at least the operating conditions. In one embodiment, the monitoring module 220 selectively activates at least one countermeasure according to, for example, attributes of the operating conditions. That is, for the security characteristics a specific listing of base group countermeasures may be specified according to the base security level. Thus, in one approach, the monitoring module 220 activates countermeasures according to the base group. In one embodiment, the base group includes countermeasures that define timing constraints for a challenge message that the asset wirelessly communicates, and content constraints indicating unique content of the challenge message for separately transmitted iterations.

In one approach, the timing constraints define aspects of one or more countermeasures such as instance timing between transmitting successive iterations of the challenge message (i.e., separate challenge messages with distinct codes), response timing for receiving a response to the challenge message, and so on. The response timing, in one approach, is a maximum time that the access system 170 will wait for a response to a particular challenge message and is derived according to, for example, a round trip time (RTT) for a message to travel a maximum permissible distance (e.g., 5-20 meters) to the transceiver 270, the transceiver 270 to process the message, and a response message to propagate back to the access system 170. Thus, when a device is located further from the access system 170 such as may occur during a relay attack, receiving a response message within the defined RTT time is unlikely. As such, implementing the timing constraints as countermeasures is an approach that can facilitate thwarting malicious communications.

At 640, the communication module 230 wirelessly communicates according to at least one countermeasure from the group of available countermeasures 250. In one embodiment, the countermeasures 250 include iteratively changing codes (e.g., pseudorandom numbers) for successive challenge messages, timing constraints for receiving responses and/or sending different challenges, monitoring for potentially threatening devices/communications, dynamically switching frequencies and/or encoding frequencies in messages, extended security handshakes, localizing a source of communications, and other such software-based mechanisms for preventing malicious attacks.

Moreover, the communication module 230 dynamically implements the countermeasures 250 according to the monitoring module 220 selectively activating individual countermeasures. Thus, as the monitoring module 220 identifies the operating conditions and changes in the operating conditions, the communication module 230 adapts the generating, transmitting, reception, and decoding of the wireless communications according to the countermeasures that are presently active. In this way, the access system 170 provides a robust and flexible defense against relay and other types of malicious attacks.

Figure 7:
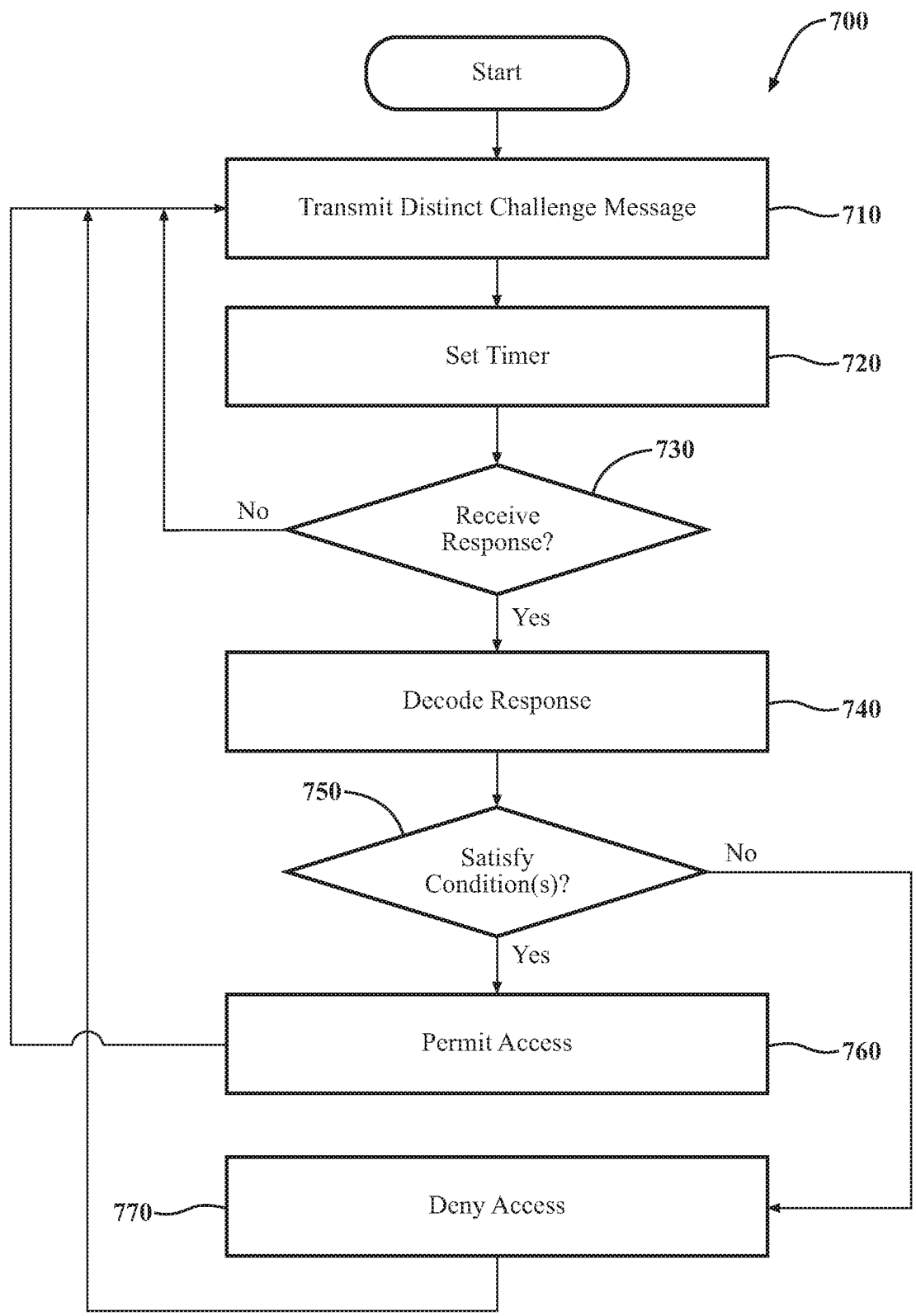
FIG. 7 is a flowchart illustrating one embodiment of a method associated with communicating to provide access while using a set of countermeasures.

FIG. 7 illustrates an additional flowchart of a method 700 that is associated with wirelessly communicating according to a set of countermeasures for preventing relay attacks. The method 700 will also be discussed from the perspective of the access system 170 of FIGS. 1-2. While method 700 is discussed in combination with the access system 170, it should be appreciated that the method 700 is also not limited to being implemented within the access system 170 but is instead one example of a system that may implement the method 700. Additionally, the following discussion of method 700 generally assumes that three of the countermeasures 250 that comprise a base group are presently active. Thus, the following discussion integrates the processing for the countermeasures as part of the method 700.

At 710, the communication module 230 transmits a challenge message. In one embodiment, the challenge message is a wireless communication that includes a code. The communication module 230 can provide the code in different forms according to the particular implementation but is generally a pseudorandom number or similar value. The communication module 230, in one or more approaches, encrypts the code using one key of an asymmetric key pair, a private key, a rolling session key, or according to another encryption scheme. In either case, the communication module 230 is effectively including a secure authentication mechanism within the challenge message that is designed to only be decrypted by a valid device such as the fob transceiver 270. In further aspects, the communication module 230 digitally signs the challenge message, generates a message authentication code that is based, at least in part, on the code, or performs another secure cryptographic routine to provide the challenge message with a means to authenticate the access system 170 and the fob transceiver 270.

Furthermore, the communication module 230 implements a countermeasure that causes each successive challenge message to include a distinct code. Thus, whereas the communication module 230 may originally transmit the same challenge message with the same code multiple times, the countermeasure adapts the communication protocol 260 to cause the communication module 230 to transmit a unique code once prior to changing the code. Alternatively, the communication module 230 may implement the countermeasure such that a unique code is transmitted in a challenge message for a limited number of transmissions or for a limited time (e.g., 2, 5, 10 seconds or another time as may be selectively defined) before changing. In this way, a particular challenge message has a limited lifetime thereby frustrating subsequent use by a malicious attacker to activate the fob transceiver 270.

Additionally, the communication module 230, in one embodiment, transmits the challenge message at a low-frequency (e.g., between 30 kHz-300 kHz) in order to limit the range in the surrounding environment that the challenge message propagates. Transmitting the message at a low-frequency functions as a security measure to limit other devices that may receive the challenge message and also ensuring the fob transceiver 270 is substantially proximate to the vehicle 100 (e.g., within 20 meters). In various embodiments, the communication module 230 transmits the challenge message on a predefined frequency as may be known by the fob transceiver 270.

Alternatively, in another approach, the communication module 230 may transmit a secure wakeup message to the fob transceiver 270 that encodes a particular frequency on which the challenge message will be provided. Thus, the fob transceiver 270 can then listen for the challenge message on the specified frequency. As such, if the transceiver 270 receives the challenge message at a different frequency, then the transceiver 270 knows the challenge message is being relayed or is otherwise malicious. As will be discussed in greater detail subsequently, the transceiver 270 can encode the reception frequency into the response message in order to inform the access device 170 of the potential malicious attack.

At 720, the communication module 230 sets a timer for the challenge message. The timer defines, in one approach, a maximum permissible time within which a response message associated with the challenge message is considered valid. In one approach, the communication module 230 defines a value of the timer according to a selected preference, a calculated round trip time, or according to another approach. For example, the calculated round trip time limits a distance at which the fob transceiver 270 may be located. That is, because the wireless communications that embody the challenge message and the response message propagate through the surrounding environment at a known rate, the time for a challenge message to reach the fob transceiver 270, at a maximum permissible distance, and for the response message to return to the access device 170 is generally known or determinable. As such, the communication module 230 can program the value of the timer according to the round trip time and any communications received beyond the time are then known to be invalid or at least suspicious.

At 730, the communication module 230 monitors for a response message to the challenge message from 710. As previously noted, the communication module 230 may wait a defined amount of time for the response message prior to transmitting the challenge message again. Thus, the communication module 230 monitors for the response message until a time constraint is satisfied (e.g., exceeded) or, in an alternative approach, continuously as a parallel process. In either case, when the communication module 230 receives a response message, the module 230 proceeds decoding as discussed at block 740. As an additional note, the transceiver 270 generally communicates the response message on a second frequency (e.g., a medium frequency) that is distinct from the first frequency. Thus, in various embodiments, the access system 170 may dynamically adapt the second frequency in a similar manner as discussed along with the first frequency.

At 740, the communication module 230 decodes the response message. In one embodiment, decoding the response message includes parsing, decrypting, and identifying relevant information from the response message so that subsequent comparisons can be undertaken to authenticate the response. For example, the communication module 230, in one embodiment, decrypts the code from the response message to determine the authenticity of the identity of the source device (i.e., the transceiver 270) as discussed further along with block 750. Moreover, in one aspect, the communication module 230 may also note a time at which the access device 170 receives the response message in relation to the timer as discussed at block 720.

At 750, the communication module 230 determines whether the response message satisfies one or more conditions. In one embodiment, the conditions include various conditions imposed by the constraints. As such, the communication module 230 determines whether the countermeasures are satisfied including whether the response message was received within the defined time of the timer, whether the correct response is encoded in the response message (e.g., in response to the active challenge message), etc. In further aspects, the communication module 230 determines whether the response message is transmitted on the correct frequency, whether the response message encodes the correct transmission frequency of the original challenge message, and so on. Thus, depending on the particular implementation, the communication module 230 may determine whether a MAC within the response message matches, a digital signature matches, a pseudo-random number encrypted by a particular key (e.g., session key) matches, and so on. Failure to meet the conditions means that the access system 170 denies access according to the particular response message as discussed further at block 770.

However, should the response message satisfy (e.g., meet or exceed) the various conditions, then the access system 170 provides access at 760. In one embodiment, the access system 170 provides access to the asset according to whether the response message satisfies at least one security criteria (e.g., matching code) and the at least one countermeasure (e.g., round-trip time). When the message does satisfy the conditions, the access system 170 permits access to the asset (e.g., vehicle). The access can include access to various compartments (e.g., doors, trunk, etc.) and also to activate an ignition of the vehicle 100. In this way, the access system 170 protects the wireless communications against malicious intervention while retaining the convenience of a passive keyless entry system.

At 770, the communication module 230 denies access according to the response message. For example, when the response message is received past the permissible time defined by the value of the timer, when the response message is not in response to an active challenge message, when the code within the response message doesn't match, when a frequency encoded for transmission or reception doesn't match or according to another condition that may not be satisfied, the communication module 230 denies access to the asset. Moreover, when the access system 170 denies access according to an invalid response message, the monitoring module 220, in one embodiment, selectively activates one or more further countermeasures in response thereto. That is, because the response message failing to satisfy the prescribed conditions may be indicative of a malicious attack on the system 170, the monitoring module 220 activates one or more of the countermeasures 250 according to which dynamic conditions are identified.

By way of example, the monitoring module 220, in one embodiment, activates an extended exchange/handshake with a responding device that is more complex (e.g., includes additional communications) and thus more difficult to subvert. Moreover, the monitoring module 220 may separately activate a secure wakeup on subsequent challenge messages that induce a frequency hopping countermeasure. In still a further aspect, the monitoring module 220 activates one or more additional countermeasures when the response message does satisfy the condition (e.g., response is received within a time constraint) but the response message is just within a defined constraint (e.g., satisfies a time constraint by a minimal margin—<1%). Thus, in summary, as discussed in relation to method 700, the communication employs at least three separate countermeasures. The noted countermeasures include iteratively changing the code in the challenge message, defining a round-trip time (RTT) for the wireless communications, and defining a time constraint for each of the unique challenge messages. Accordingly, the access system 170 improves the overall security of the vehicle 100 through the selective implementation of the countermeasures 250.

As a further explanation of how the access system 170 improves the identification and mitigation of the noted occurrences, the system 170 will now be discussed in relation examples of countermeasures as illustrated in FIGS. 8-13.

Figure 8:
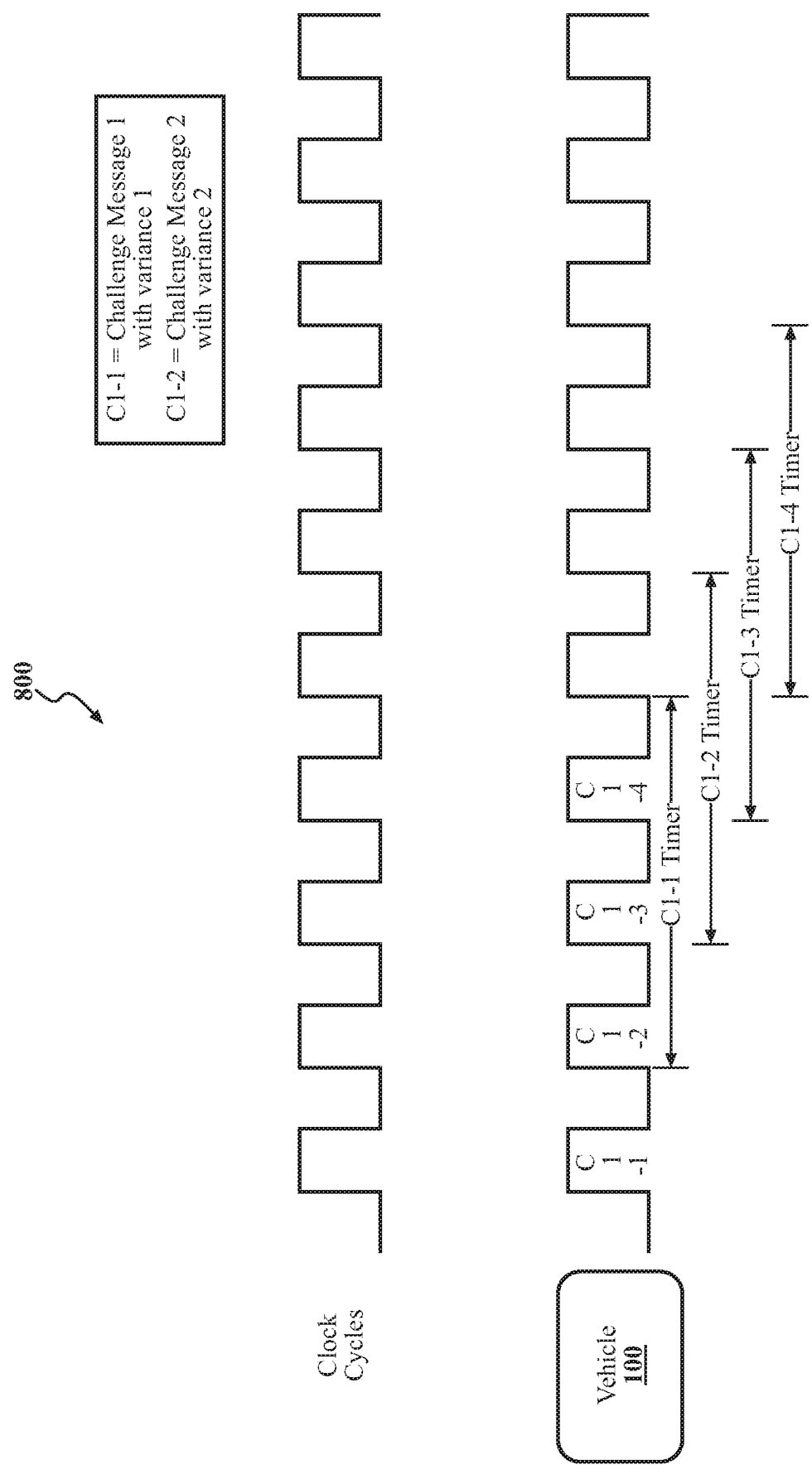
FIG. 8 is a timing diagram illustrating an exemplary countermeasure.

FIG. 8 illustrates an exemplary scenario 800 of a timing constraint for the viability of a challenge message. As shown in FIG. 8, the vehicle 100 transmits a distinct challenge message at each clock cycle. It should be appreciated that while a challenge message is shown as being transmitted at each clock cycle, in various embodiments, the communication module 230 may transmit the separate unique challenge messages at different intervals (e.g., every other clock, every fifth clock, etc.). Moreover, only four separate messages are shown for purposes of the brevity of this explanation; however, in practice, the noted pattern can be repeated indefinitely.

In either case, the communication module 230 is separately defining timers for each of the timers C1-1, C1-2, C1-3, C1-4, and so on. The timer generally defines a duration of time within which the challenge message is considered viable and thus within which a response to the challenge message will be accepted. The value of the timer is, in one embodiment, dynamically adaptable according to the operating conditions. For example, when an imminent threat is present, the access system 170 may reduce the timer, while during other times the access system 170 may extend the timer.

Figure 9:
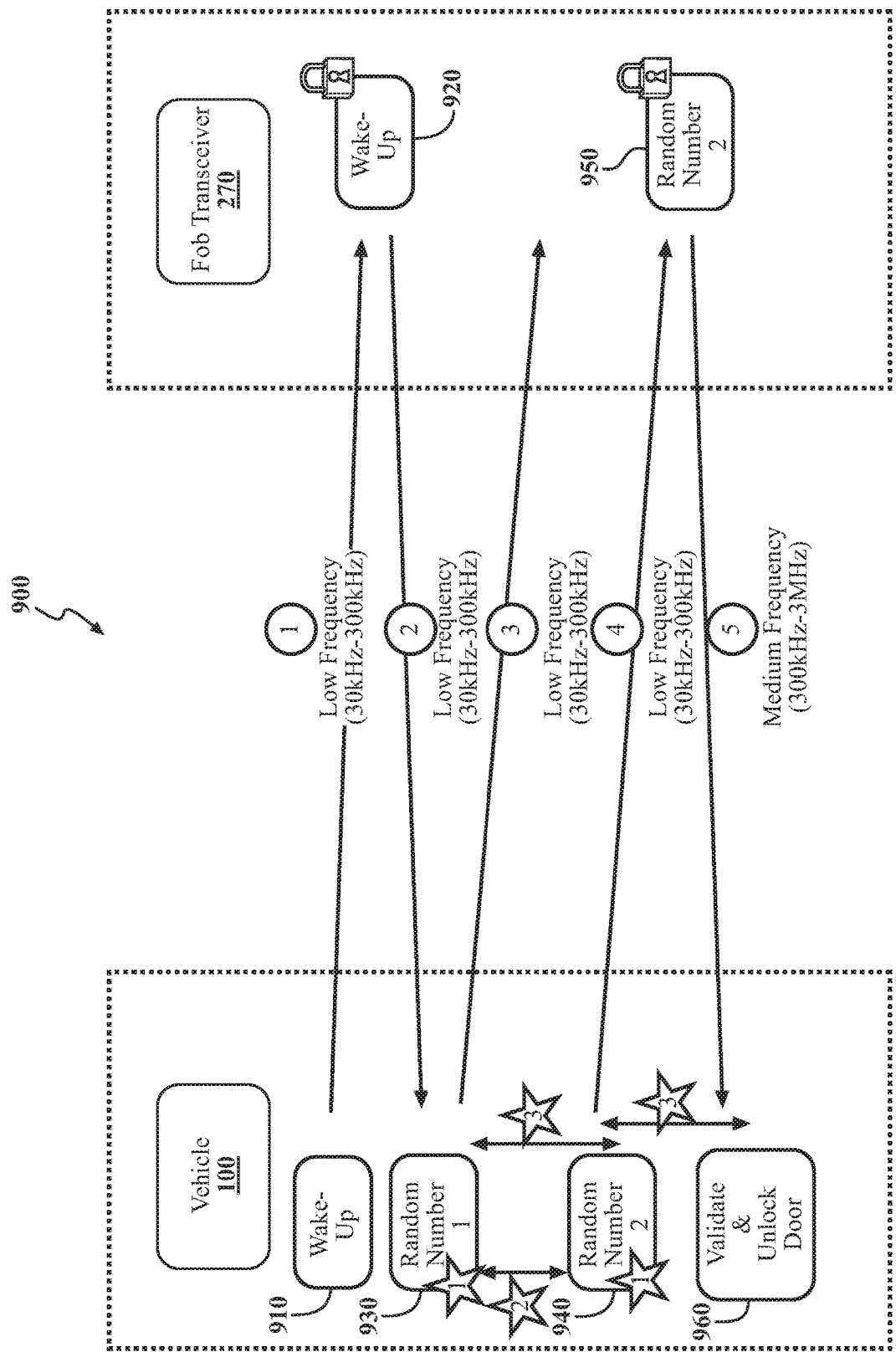
FIG. 9 illustrates an exemplary exchange of wireless communications according to a set of countermeasures.

FIG. 9 illustrates an exemplary exchange 900 according to a group of three separate countermeasures. As shown in FIG. 9, communications associated with the implementation of a countermeasure are labeled 1-3. Overall, FIG. 9 illustrates an exchange involving communications 910, 920, 930, 940, 950, and a verification 960. Countermeasure 1 involves a random number (i.e., code) within challenge messages 930 and 940 changing between messages. That is, countermeasure 1, as shown, requires that each separate challenge message that the vehicle 100 transmits include a unique code. Countermeasure 2 indicates a time between transmission of distinct challenge messages, whereas countermeasure 3 indicates a maximum round-trip time (RTT) for receiving a response to a particular challenge message. Thus, as depicted, the vehicle 100 is actively implementing three distinct countermeasures. The three countermeasures that are illustrated in FIG. 9 may be active as a base group of countermeasures according to the security characteristics of the access system 170.

Figure 10:
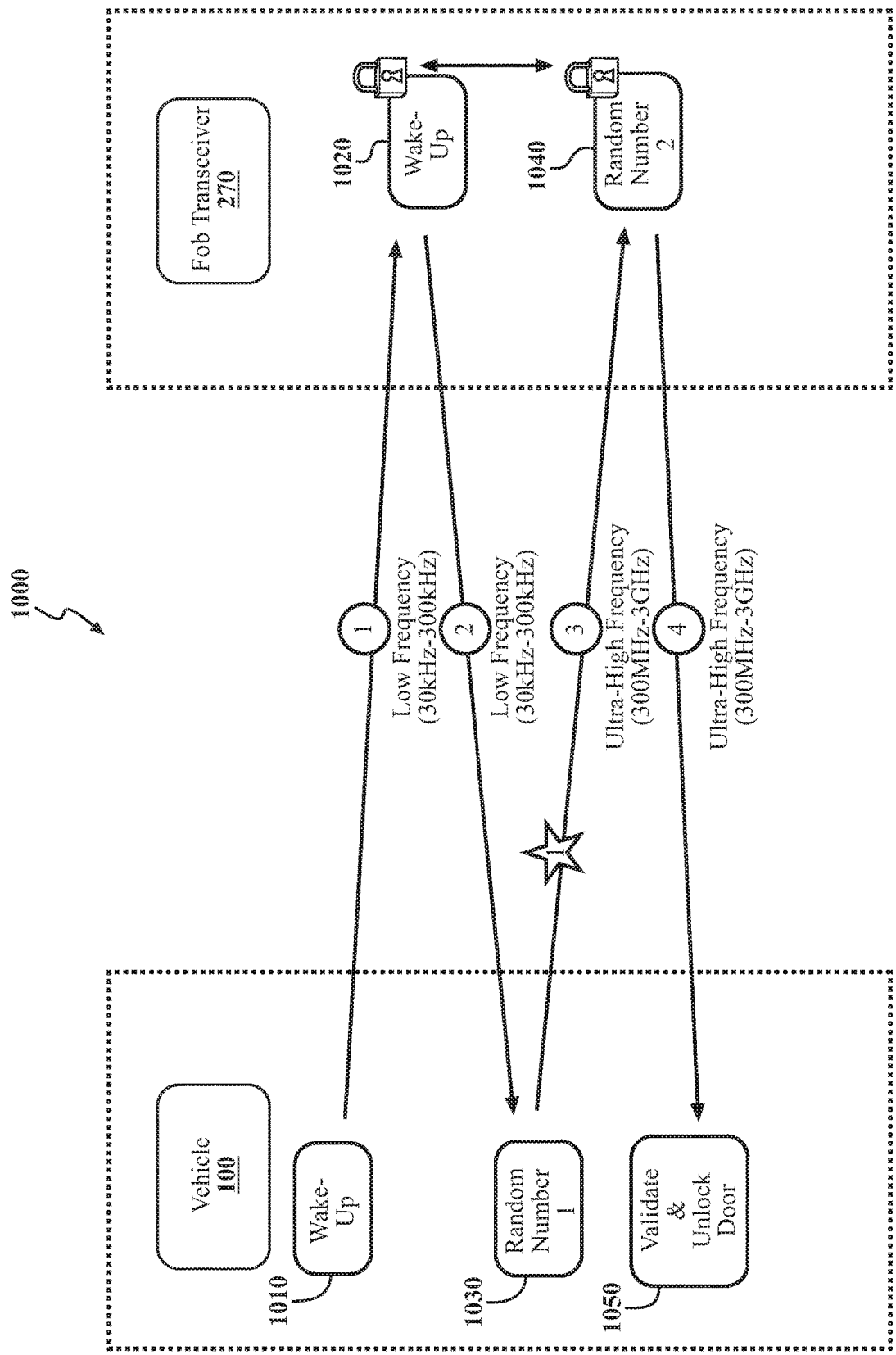
FIG. 10 illustrates one example of a frequency hopping countermeasure for dynamically changing a communication frequency.

FIG. 10 illustrates an exemplary exchange 1000 according to frequency hopping countermeasure. As shown in FIG. 10, the communication module 230 implements the frequency hopping countermeasure using a series of communication 1-4 with communication 3 being associated with the particular countermeasure. Moreover, FIG. 10 further illustrates the substance of the communications and associated actions as blocks 1010, 1020, 1030, 1040, and 1050. The countermeasure 1 illustrated in FIG. 10 involves transmitting and receiving at least two sets of communications provided on disparate frequencies. In general, the vehicle 100/access system 170 specifies a response frequency on which the fob transceiver 270 is to respond using a wakeup 1010/1020 communication provided on a first frequency. It should be appreciated that while a particular range of frequencies are indicated, other frequencies associated with different protocols (e.g., Bluetooth) may also be used.

Thus, once the transceiver 270 receives the wakeup 1010 and responds with a message 1020, the vehicle 100 transmits the challenge message 1030 on the secondary frequency that was previously specified. In one embodiment, the transceiver 270 encodes the frequency of the challenge message 1030 in the response 1040, which is then validated by the vehicle 100 at 1050. In various embodiments, the access system 170 implements the countermeasure illustrated in FIG. 10 according to dynamic conditions such as receiving an incorrectly coded response message, another countermeasure detecting a potential malicious attacker, and so on.

Figure 11:
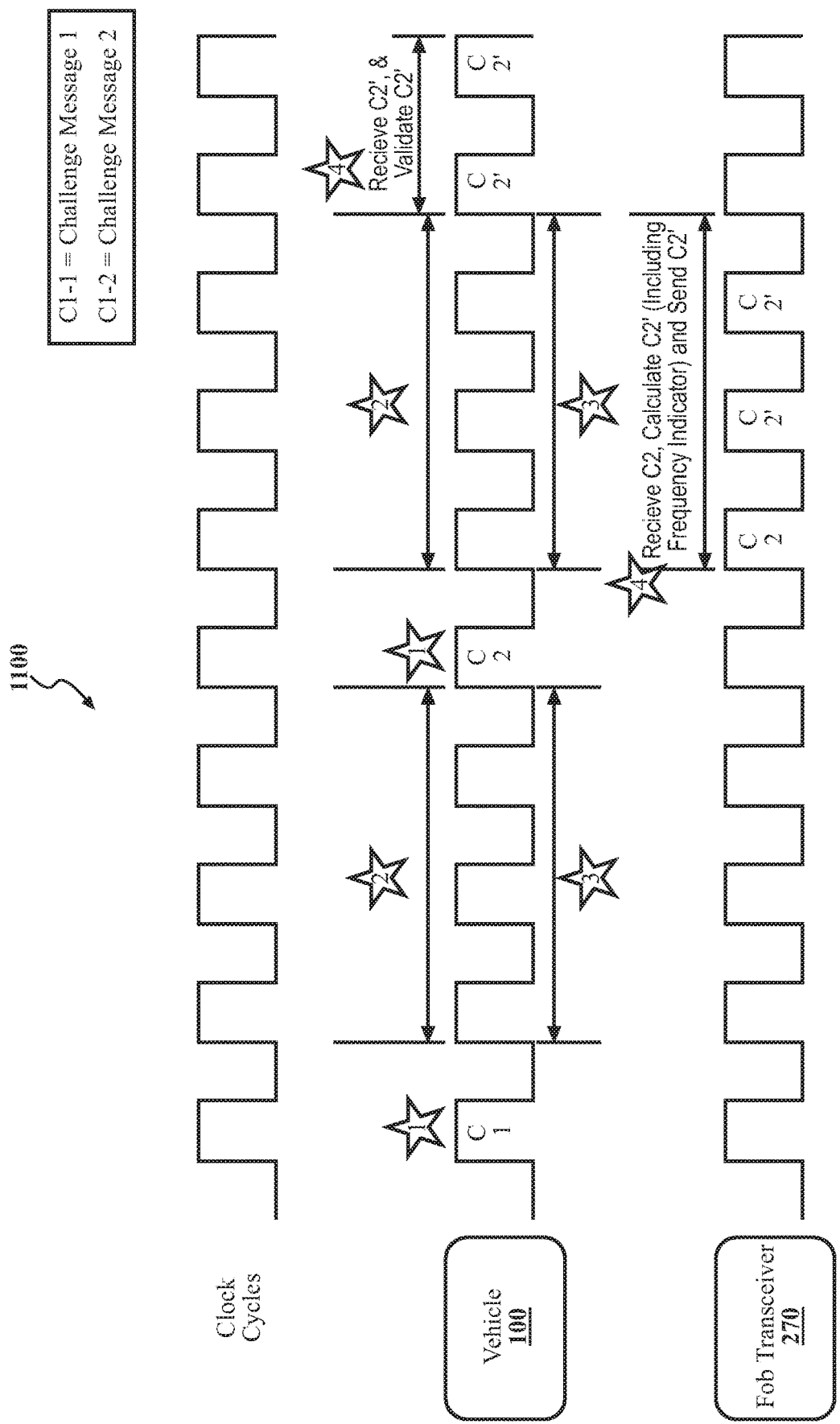
FIG. 11 is a timing diagram illustrating aspects of several different countermeasures and associated communications.

FIG. 11 illustrates an exemplary timing diagram 1100 according to another group of separate countermeasures. As shown in FIG. 11, the communication module 230 implements countermeasures labeled as 1-4. The labels generally correlate with communications or actions in the diagram that involve the particular countermeasure. Countermeasure 1 involves using a unique challenge message for each transmission, as previously described. Countermeasure 2 involves the access system 170 monitoring for communications that indicate an attacker is attempting to relay challenge message c1. Thus, the access system 170 may implement countermeasure 2 by, for example, listening for communications sent on a similar frequency and/or at a time that is proximate to the transmission of c1 or another challenge message.

FIG. 11 further illustrates a countermeasure 3 that specifies a time that the access system 170 waits prior to switching the code in the challenge message (e.g., between switching from c1 to c2 to cn). Countermeasure 4 involves the communication module 230 encoding the frequency range of the challenge message in a response to the access system 170. Thus, as shown in FIG. 11, the transceiver 270 encodes the detected frequency in the response message, which is then decoded by the access system upon receipt and verified. Of course, if a relay attacker retransmits the challenge message, then the transceiver 270 is likely to receive the challenge message on a different frequency, which can then be detected by the access system 170 in the response message. Similar to the dynamic conditions previously identified, the monitoring module 220 may selectively activate one or more of the countermeasures 1-4 of FIG. 11 according to invocation by another countermeasure (e.g., sniffing), an incorrectly coded response message, etc.

Figure 12:
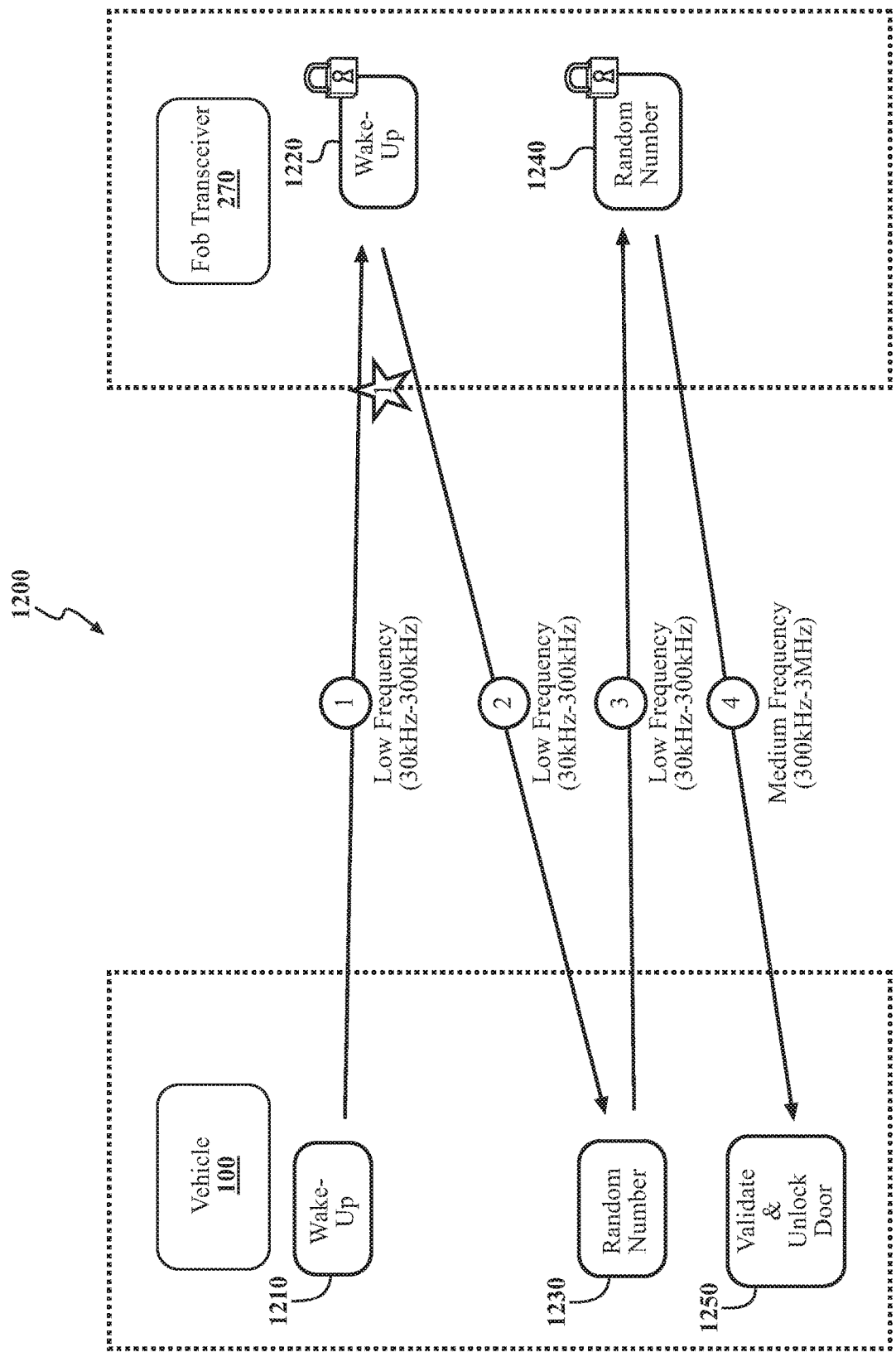
FIG. 12 illustrates an exemplary exchange of communications according to a challenge countermeasure.

FIG. 12 an exemplary exchange 1200 according to a challenge countermeasure. As shown in FIG. 12, the communication module 230 implements the challenge countermeasure by appending additional communications to the front of the exchange 1200. That is, whereas the communication module 230 generally provides a challenge message as a first message in a sequence, when the challenge countermeasure is active, the communication module 230 initially provides a wake-up message 1210 to which the transceiver responds with a message 1220. Thereafter, the communication module 230 provides a challenge message 1230 as is otherwise the general procedure indicated by the protocol 260. Thus, the challenge countermeasure implements an additional series of communications to the overall handshake between the access system 170 and the transceiver 270. The noted countermeasure 1 from FIG. 12 is, for example, dynamically activated by the monitoring module 220 when the monitoring module 220 detects a response message that is substantially near a time constraint (e.g., RTT max value), according to invocation by another countermeasure (e.g., sniffing a malicious communication), etc.

Figure 13:
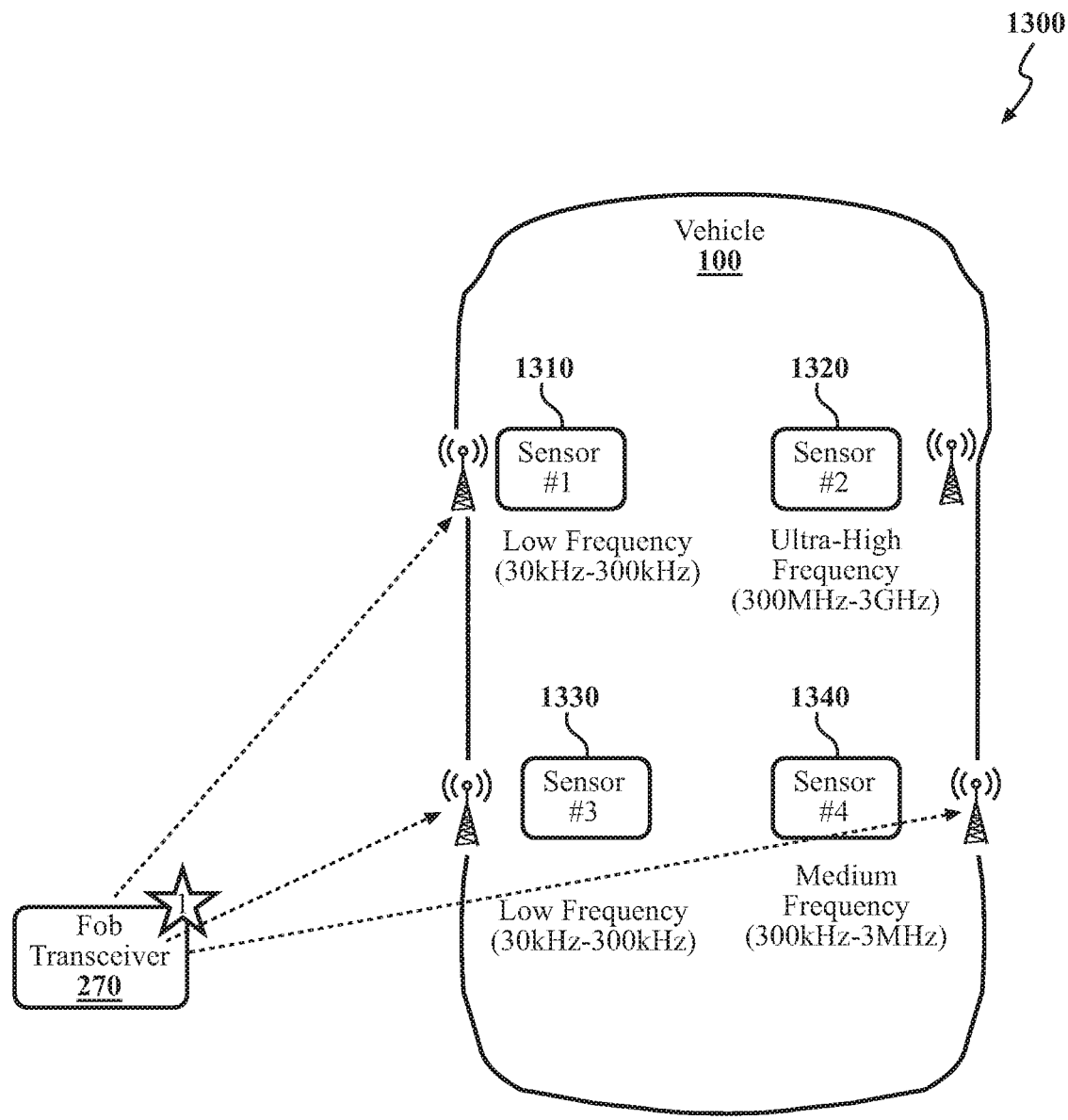
FIG. 13 illustrates one example of a location countermeasure for localizing a Fob transceiver relative to an asset.

FIG. 13 illustrates one example 1300 of a location countermeasure for localizing the fob transceiver 270. The location countermeasure involves the communication module 230 harvesting information about communications from the transceiver 270. That is, the monitoring module 220 listens to various sensors in the vehicle 100 such as antennas 1310, 1320, 1330, and 1340. The antennas 1310-1340 may be located in separate doors, corner panels, a trunk, and/or a combination of the noted locations. The antennas 1310-1340 generally provide communications for a passive keyless entry system, a wireless network interface (NIC), a Bluetooth communication system, and so on. Thus, the monitoring module 220 listens to communications received by the various antennas to detect characteristics of the communications from the transceiver. The communications may include signal strength indicators, different frequencies in use by the transceiver 270, and so on. From this information, the monitoring module 220 localizes (e.g., triangulates) the transceiver 270 in the surrounding environment and may also determine a likely trajectory of the transceiver 270.

Thus, the monitoring module 220 can verify whether the transceiver 270, and by extension, the vehicle owner/user is proximate to the vehicle 100 or on a path toward/near the vehicle 100. Accordingly, the monitoring module 220 may define zones around the vehicle 100 of varying distances and quadrants to iteratively localize the transceiver 270. In one embodiment, if the localization identifies that the transceiver 270 is not within one of the zones and/or has a trajectory away from the vehicle 100, then the access system 170 may automatically deny an access request. In this way, the access system 170 can further leverage existing mechanisms within the vehicle 100 to gain further information that facilitates thwarting malicious attacks. While localizing the transceiver 270 is generally discussed in relation to triangulating the transceiver 270 using wireless communications, in further aspects, the monitoring module 220 localizes the transceiver 270 using GPS coordinates of the transceiver 270 and the vehicle 100, using image sensors (e.g., a camera) to identify an individual associated with the transceiver is proximate to the vehicle, and so on.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the access system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the access system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the access system 170, and/or the autonomous driving module(s) 160 may control some or all of these vehicle systems 140 and, thus, may be partially or fully autonomous.

The processor(s) 110, the access system 170, and/or the autonomous driving module(s) 160 can be operatively connected to communicate with the various vehicle systems 140 and/or individual components thereof. For example, returning to FIG. 1, the processor(s) 110, the access system 170, and/or the autonomous driving module(s) 160 can be in communication to send and/or receive information from the various vehicle systems 140 to control the movement, speed, maneuvering, heading, direction, etc. of the vehicle 100. The processor(s) 110, the access system 170, and/or the autonomous driving module(s) 160 may control some or all of these vehicle systems 140.

The processor(s) 110, the access system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the access system 170, and/or the autonomous driving module(s) 160 can control the direction and/or speed of the vehicle 100. The processor(s) 110, the access system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the access system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the countermeasures 250 as implemented by the communication module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-13, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An access system for securing wireless communications for passive keyless entry (PKE) to an asset, comprising:
one or more processors;
a memory communicably coupled to the one or more processors and storing:
a monitoring module including instructions that, when executed by the one or more processors, cause the one or more processors to monitor operating conditions associated with the asset, the operating conditions identifying security characteristics of the asset and interactions of wireless devices with the asset, and
selectively activate at least one countermeasure from an available group of countermeasures according to at least the operating conditions, including instructions to selectively activate additional countermeasures beyond the at least one countermeasure according to the operating conditions and responsive to detecting a malicious attacker, and to monitor the operating conditions including monitoring by:
i) detecting nearby wireless communications having a substantially similar transmission frequency, ii) receiving a response at or beyond a timing constraint, iii) identifying a tracked trajectory for a source of a communication that does not correlate with a location proximate to the asset, and iv) identifying a communication that fails to satisfy an active one of the available group of countermeasures; and
a communication module including instructions that when executed by the one or more processors cause the one or more processors to wirelessly communicate with an accessing device according to the at least one countermeasure.

2. The access system of claim 1, wherein the asset is a vehicle that includes a PKE system, wherein the available group of countermeasures include separate modifications to a communication protocol that define how the asset wirelessly communicates for the PKE,
wherein the monitoring module includes instructions to monitor the operating conditions that execute in parallel with at least the communication module wirelessly communicating, and
wherein the available group of countermeasures function to thwart malicious attacks to access the asset by one or more of: modifying a format of communications between the asset and the accessing device, and modifying routines for providing and receiving the communications.

3. The access system of claim 1, wherein the communication module includes instructions to wirelessly communicate including instructions to:
transmit, at a first frequency, a challenge message as a function of the at least one countermeasure, and
in response to receiving, on a second frequency, a response message to the challenge message, provide access to the asset according to whether the response message satisfies at least one security criteria and the at least one countermeasure.

4. The access system of claim 1, wherein the monitoring module includes instructions to monitor the operating conditions including instructions to sniff the wireless communications present at the asset to identify nearby devices, and
wherein the monitoring module includes instructions to selectively activate the at least one countermeasure including instructions to activate one or more additional countermeasures from the available group in response to detecting that at least one of the wireless communications correlate with a malicious attacker.

5. The access system of claim 1, wherein the communication module includes instructions to wirelessly communicate including instructions to:
responsive to a challenge countermeasure being activated, wirelessly communicate by transmitting and receiving a series of several communications as defined by the challenge countermeasure, the series of several communications including at least a set of wakeup communications prior to a challenge message.

6. The access system of claim 1, wherein the monitoring module includes instructions to selectively activate including instructions to
activate timing constraints for a challenge message that the asset wirelessly communicates that cause the communication module to vary instance timing between transmitting successive iterations of the challenge message and vary response timing for receiving a response to the successive iterations of the challenge message.

7. The access system of claim 1, wherein the security characteristics define a base security level of the asset, wherein the monitoring module includes instructions to selectively activate the at least one countermeasure including instructions to activate a base group that is a subset from the available group according to the base security level, wherein the base group includes countermeasures defining:
   timing constraints for a challenge message that the asset wirelessly communicates,
   content constraints defining unique content of the challenge message for separate iterations,
   the timing constraints defining instance timing between transmitting successive iterations of the challenge message and response timing for receiving a response to the challenge message.

8. The access system of claim 1, wherein the communication module includes instructions to wirelessly communicate including instructions to:
   responsive to a frequency hopping countermeasure being activated, wirelessly communicate by transmitting and receiving at least two sets of communications provided on disparate frequencies, the asset specifying a second frequency on which a wireless device is to respond in a wakeup communication provided on a first frequency by the asset.

9. The access system of claim 1, wherein the communication module includes instructions to wirelessly communicate including instructions to:
   responsive to a location countermeasure being activated, wirelessly communicate by transmitting and receiving at least a challenge message and a response message, and verifying that the accessing device providing the response message is proximate to the asset,
   wherein verifying the accessing device is proximate to the asset includes localizing the wireless device using one or more sensors of the asset.

10. A non-transitory computer-readable medium for securing wireless communications for passive keyless entry (PKE) to an asset and including instructions that, when executed by one or more processors, cause the one or more processors to:
    monitor operating conditions associated with the asset, the operating conditions identifying security characteristics of the asset and interactions of wireless devices with the asset, and
    selectively activate at least one countermeasure from an available group of countermeasures according to at least the operating conditions, including instructions to selectively activate additional countermeasures beyond the at least one countermeasure from the available group according to the operating conditions and responsive to detecting a malicious attacker, and to monitor the operating conditions including:
    i) detecting nearby wireless communications having a substantially similar transmission frequency, ii) receiving a response at or beyond a timing constraint, iii) identifying a tracked trajectory for a source of a communication that does not correlate with a location proximate to the asset, and iv) identifying a communication that fails to satisfy an active one of the available group of countermeasures; and
    wirelessly communicate with an accessing device according to the at least one countermeasure.

11. The non-transitory computer-readable medium of claim 10, wherein the available group of countermeasures include separate modifications to a communication protocol that define how the asset wirelessly communicates for the PKE,
    wherein the available group of countermeasures function to thwart malicious attacks to access the asset by one or more of: modifying a format of communications between the asset and the accessing device, and modifying routines for providing and receiving the communications,
    wherein the instructions to selectively activate the at least one countermeasure including instructions to activate a base group that is a subset from the available group according to a base security level,
    wherein the base group includes countermeasures defining: timing constraints for a challenge message that the asset wirelessly communicates, and content constraints defining unique content of the challenge message for separate iterations, the timing constraints defining instance timing between transmitting successive iterations of the challenge message and response timing for receiving a response to the challenge message.

12. A method, comprising:
    monitoring operating conditions associated with an asset, the operating conditions identifying security characteristics of the asset and interactions of wireless devices with the asset, including selectively activating additional countermeasures beyond an at least one countermeasure from an available group according to the operating conditions and responsive to detecting a malicious attacker, and to monitor the operating conditions including:
    i) detecting nearby wireless communications having a substantially similar transmission frequency, ii) receiving a response at or beyond a timing constraint, iii) identifying a tracked trajectory for a source of a communication that does not correlate with a location proximate to the asset, and iv) identifying a communication that fails to satisfy an active one of the available group of countermeasures; and
    selectively activating at least one countermeasure from the available group of countermeasures according to at least the operating conditions; and
    wirelessly communicating, by the asset with an accessing device, according to the at least one countermeasure.

13. The method of claim 12, wherein the available group of countermeasures include separate modifications to a communication protocol that define how the asset wirelessly communicates for passive keyless entry (PKE),
    wherein monitoring occurs in parallel with at least wirelessly communicating, and
    wherein the available group of countermeasures function to thwart malicious attacks to access the asset by one or more of: modifying a format of communications between the asset and the accessing device, and modifying routines for providing and receiving the communications.

14. The method of claim 12, wherein wirelessly communicating includes:
    transmitting, at a first frequency, a challenge message as a function of the at least one countermeasure, and
    in response to receiving, on a second frequency, a response message to the challenge message, providing access to the asset according to whether the response message satisfies at least one security criteria and the at least one countermeasure.

15. The method of claim 12, wherein monitoring the operating conditions include, sniffing wireless communications present at the asset to identify nearby devices,
    wherein selectively activating the at least one countermeasure includes activating one or more additional countermeasures from the available group in response to detecting that at least one of the wireless communications correlate with a malicious attacker.

16. The method of claim 12, wherein wirelessly communicating includes:

responsive to a challenge countermeasure being activated, wirelessly communicating by transmitting and receiving a series of several communications as defined by the challenge countermeasure, the series of several communications including at least a set of wakeup communications prior to a challenge message.

17. The method of claim 12, wherein selectively activating includes activating timing constraints for a challenge message that the asset wirelessly communicates that cause the asset to vary instance timing between transmitting successive iterations of the challenge message and vary response timing for receiving a response to the successive iterations of the challenge message.

18. The method of claim 12, wherein the security characteristics define a base security level of the asset, wherein selectively activating the at least one countermeasure includes activating a base group that is a subset from the available group according to the base security level, wherein the base group includes countermeasures defining:

timing constraints for a challenge message that the asset wirelessly communicates, content constraints defining unique content of the challenge message for separate iterations, the timing constraints defining instance timing between transmitting successive iterations of the challenge message and response timing for receiving a response to the challenge message.

19. The method of claim 12, wherein wirelessly communicating includes:

responsive to a frequency hopping countermeasure being activated, wirelessly communicating by transmitting and receiving at least two sets of communications provided on disparate frequencies, the asset specifying a second frequency on which a wireless device is to respond in a wakeup communication provided on a first frequency by the asset.

20. The method of claim 12, wherein wirelessly communicating includes:

responsive to a location countermeasure being activated, wirelessly communicating by transmitting and receiving at least a challenge message and a response message, and verifying that the accessing device providing the response message is proximate to the asset, wherein verifying the accessing device is proximate to the asset includes localizing the accessing device according to one or more sensors of the asset.

\* \* \* \* \*